United States Patent
Nguyen et al.

(10) Patent No.: US 12,138,997 B2
(45) Date of Patent: Nov. 12, 2024

(54) PINCH SENSOR ASSEMBLY, VEHICLE DOOR HAVING SAME AND MANUFACTURING METHOD THEREOF

(71) Applicant: Honda Motor Co., Ltd., Tokyo (JP)

(72) Inventors: Khang C. Nguyen, Columbus, OH (US); Hiroshi Shingu, Columbus, OH (US); Yuichiro Saiki, Columbus, OH (US); Makoto Hirose, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 461 days.

(21) Appl. No.: 17/531,025

(22) Filed: Nov. 19, 2021

(65) Prior Publication Data
US 2023/0158867 A1  May 25, 2023

(51) Int. Cl.
*B60J 5/04* (2006.01)
*B60R 16/02* (2006.01)

(52) U.S. Cl.
CPC ........... *B60J 5/0493* (2013.01); *B60J 5/0468* (2013.01); *B60R 16/0215* (2013.01)

(58) Field of Classification Search
CPC ...... B60J 5/0413; B60J 5/0468; B60J 5/0493; B60J 5/0495; B60J 16/0215; E05F 15/46; E05F 15/42; B60R 13/0243
USPC ........................................... 296/146.7, 146.9
See application file for complete search history.

(56) References Cited

U.S. PATENT DOCUMENTS

| | | | |
|---|---|---|---|
| 6,339,305 B1 * | 1/2002 | Ishihara | E05F 15/44 49/27 |
| 8,348,330 B2 * | 1/2013 | Higgins | B60R 16/0215 49/27 |
| 8,641,125 B2 | 2/2014 | Jimenez et al. | |
| 8,752,332 B2 * | 6/2014 | Thiele | B60J 5/06 49/27 |
| 8,876,188 B1 * | 11/2014 | She | B60J 10/84 296/146.7 |
| 9,114,691 B2 * | 8/2015 | Kawaguchi | B29C 45/16 |
| 9,484,914 B2 | 11/2016 | Pohl | |
| 10,286,612 B2 | 5/2019 | Barrenscheen | |
| 10,821,641 B2 | 11/2020 | Hattori et al. | |
| 2006/0087418 A1 * | 4/2006 | Takeuchi | B60J 5/06 340/438 |
| 2006/0113943 A1 * | 6/2006 | Yamauchi | H01H 3/142 292/144 |

(Continued)

FOREIGN PATENT DOCUMENTS

| CN | 109693994 A | 4/2019 |
|---|---|---|
| CN | 211776756 U | 10/2020 |

(Continued)

*Primary Examiner* — Gregory A Blankenship
(74) *Attorney, Agent, or Firm* — KENEALY VAIDYA LLP

(57) ABSTRACT

Some embodiments are directed to a vehicle door that includes a door frame and a trim panel connected to the door frame. The vehicle door can also include an upper garnish connected to the door frame and including a connection portion. A bracket can be disposed along an edge of the trim panel and extend along a length of the door frame. The bracket can snap fit into the connection portion of the upper garnish, and a pinch sensor can be disposed on the bracket.

19 Claims, 11 Drawing Sheets

(56) References Cited

U.S. PATENT DOCUMENTS

| | | | | | |
|---|---|---|---|---|---|
| 2007/0113481 | A1* | 5/2007 | Kato | .................. | E05F 15/46 49/27 |
| 2007/0273545 | A1* | 11/2007 | Hoshina | .................. | E05F 15/42 340/665 |
| 2009/0100755 | A1* | 4/2009 | Ishihara | .................. | E05F 15/46 49/31 |
| 2013/0200649 | A1* | 8/2013 | Priess | .................. | B32B 38/0008 156/273.3 |
| 2017/0328112 | A1* | 11/2017 | Okada | .................. | E05F 15/42 |
| 2018/0348945 | A1* | 12/2018 | Taguchi | .................. | H03K 17/962 |
| 2020/0223295 | A1* | 7/2020 | Matsumoto | .................. | B60J 5/06 |
| 2020/0362617 | A1* | 11/2020 | Williams | .................. | G01L 5/00 |
| 2023/0158867 | A1* | 5/2023 | Nguyen | .................. | B60J 5/0493 296/146.9 |
| 2023/0235609 | A1* | 7/2023 | Nguyen | .................. | B60R 16/0215 49/26 |

FOREIGN PATENT DOCUMENTS

| | | |
|---|---|---|
| JP | 4181369 B2 | 11/2008 |
| JP | 4680848 B2 | 5/2011 |
| JP | 5917088 B2 | 5/2016 |
| KR | 100736966 B1 | 7/2007 |
| KR | 20120050290 A | 5/2012 |
| KR | 101198628 B1 | 11/2012 |
| WO | WO2014096026 A1 | 6/2014 |
| WO | WO2016162379 A1 | 10/2016 |
| WO | WO2018083422 A1 | 5/2018 |
| WO | WO2019024505 A1 | 2/2019 |
| WO | WO2020029471 A1 | 2/2020 |
| WO | WO2020029472 A1 | 2/2020 |
| WO | WO2020029474 A1 | 2/2020 |

* cited by examiner

PINCH SENSOR ASSEMBLY, VEHICLE DOOR HAVING SAME AND MANUFACTURING METHOD THEREOF

BACKGROUND

The disclosed subject matter relates to a pinch sensor assembly, vehicle door having same, method of using, and manufacture method thereof. More particularly, the disclosed subject matter relates to methods and apparatus for attaching a pinch sensor assembly to a vehicle door, a vehicle door including the pinch sensor assembly, and methods of manufacturing the vehicle door and the pinch sensor assembly.

Many types of vehicles, such as those that travel on land, through water, by air, etc. define doors for various purposes, such as to allow ingress and egress of vehicle occupants, loading or unloading of cargo, etc. Some such vehicles include a single door, while other may include multiple doors. Exterior doors can be configured to be opened and closed so that when they are opened, an occupant can enter and exit the vehicle (or cargo can be loaded/unloaded), while when they are closed, the occupant (or cargo) is confined within the vehicle. Interior doors can be used to define discrete spaces within the vehicles, such as in the case of doors that define restrooms, vehicle operator compartments, storage compartments, etc., of trains, boats, airplanes, etc.

Many exterior and interior doors involve at least two discrete operations. For example, the doors are movable between a fully open position and a close position (or a position adjacent the closed position). The doors can also be actuated from their closed position (or adjacent the closed position) to a latched condition that, to some extent, impedes opening of the door. The latched condition can reduce impede or prevent the door from unintentionally opening under various conditions, such as during vehicle movement.

SUMMARY

Some embodiments are directed to a pinch sensor assembly for a vehicle. The vehicle can include a door that includes door trim. The pinch sensor assembly can include a bracket located along a length of the door and molded into the door trim. The pinch sensor assembly can include an upper garnish located on the door. The upper garnish can include a snap fit connector. A sensor can be disposed on the bracket and the bracket can include a second snap fit connector configured to snap fit into the snap fit connector of the upper garnish.

Some embodiments are directed to a vehicle door. The vehicle door can include a door frame, a trim panel connected to the door frame, and an upper garnish connected to the door frame and including a connection portion. The vehicle door can include a bracket disposed along an edge of the trim panel and extending along a length of the door frame. The bracket can snap fit into the connection portion of the upper garnish. The vehicle door can include a sensor disposed on the bracket.

Some embodiments are directed to a method for manufacturing a pinch sensor assembly for a vehicle. The method can include: attaching an upper garnish to a vehicle door so as to cover at least a portion of the interior of the vehicle door; attaching a pinch sensor to a bracket; molding the bracket into a door trim; attaching the door trim to the vehicle door; snap fitting the bracket into the upper garnish when the vehicle door is at an end of a door assembly line; and extending the bracket along the vehicle door such that the bracket covers an entire length of the vehicle door in a vertical direction of the vehicle.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Vehicles can include one or more doors. The doors can move from an open position to a closed position, or from a closed position to an open position, without an operator directly or physically moving the door. A vehicle door that can operate using an actuation device can be called a powered door. Operators can utilize a remote signal to actuate a vehicle's powered door. Vehicles can include sensors that can determine whether the path between a door's current position and subsequent position is obstructed. These sensors can be included as part of an assembly included in a vehicle door. Accordingly, it can be beneficial to provide a sensor assembly that facilitates simple connection to a vehicle door.

The embodiments are disclosed below in the context of a slide door of an automobile, and in particular a minivan. However, the embodiments are intended to be applicable to any vehicle door assembly, any type of automobile, truck, watercraft, airplanes, and further applicable to both exterior and interior doors.

Embodiments are also disclosed below in the context of a powered vehicle door that can be moved by a drive motor between a fully open position and a closed position or a position adjacent the close position, i.e., to provide powered movement longitudinally such as along an elongated track system. However, embodiments are intended to include or otherwise cover any type of vehicle door that can utilize an actuation device to actuate between open and closed positions. Further, the disclosed subject matter can also be directed to a door that is (or is not) motor operated for the longitudinal closing action and includes a sealing action motion in which the door is brought closer to the body of the vehicle and latched in a final closing movement. It is also in this final closing movement in which a pinch sensor can be used to detect whether a user's body is located in between the door and the vehicle body even though the door is not being prevented from longitudinal movement at this time. Instead, in this embodiment, the user's body is being pinched between the door and the vehicle body during a motion of the door that is substantially inward towards a center of the vehicle, for example.

Figure 1:
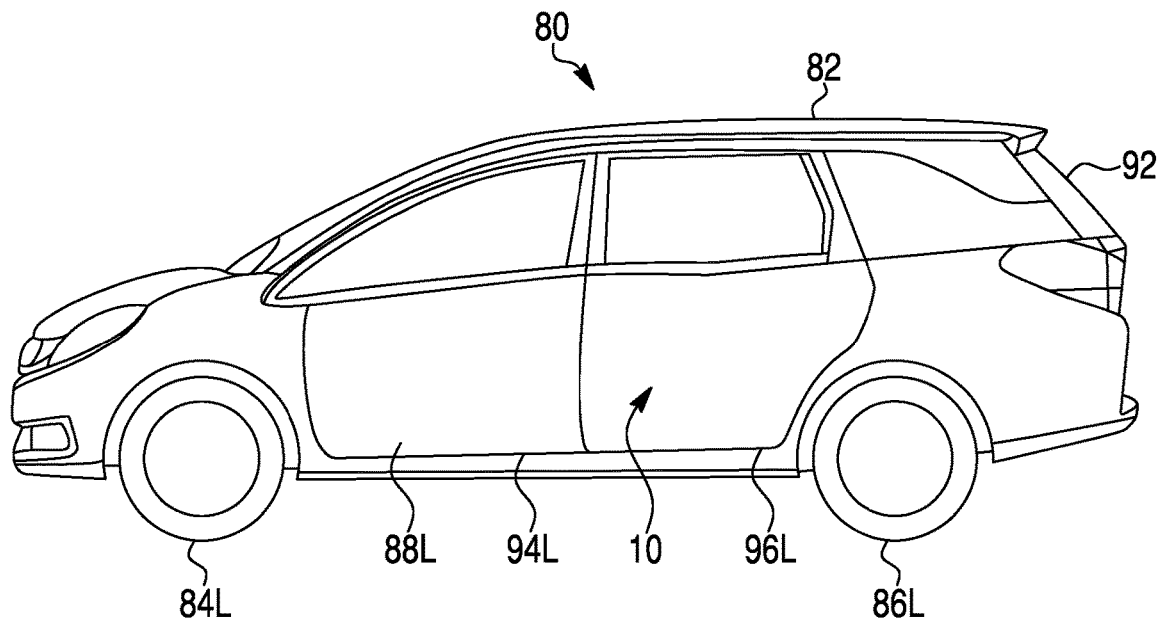
FIG. 1 is a side view of a vehicle with a vehicle door in a closed position in accordance with principles of the disclosed subject matter and a schematic drawing of the electrical connection of a pinch sensor assembly in accordance with the disclosed subject matter.
Figure 1:
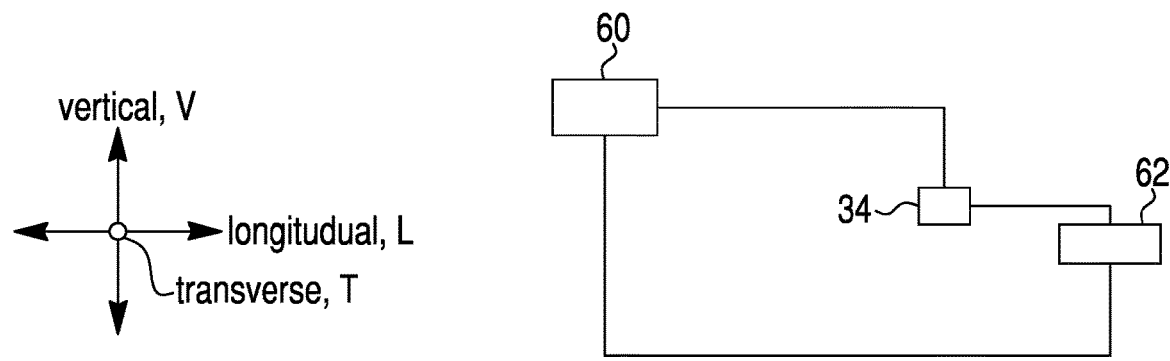

FIG. 1 is a side view of a vehicle 80 with a vehicle door 10 (also referred to as a door or slide door) in a closed position in accordance with the disclosed subject matter. The vehicle 80 shown in FIG. 1 can primarily be used on paved roadways, and can be referred to as a passenger vehicle, and in particular, a minivan. However, the vehicle door 10 can be used with any vehicle that is configured for travel along any one or combination of improved, unimproved, and unmarked roadways and paths constituted by gravel, dirt, sand, etc., as well as in water and air travel vehicles. For example, embodiments are intended to include or otherwise cover any other type of vehicle, including passenger car, truck, van, ATV, etc. In fact, embodiments are intended to include or otherwise cover configurations of the vehicle door 10 for use in any other type of vehicle, such as aircraft, boat, ship, train, spacecraft, etc. Some other embodiments can be used in non-vehicular applications, such as for amusement park rides, elevators, or any other situations where occupants are disposed with an enclosed space defined by a powered door for ingress and egress.

The vehicle 80 can be described as having a longitudinal direction L, a vertical direction V, and a transverse direction T. Height can be measured in the vertical direction V.

The vehicle 80 can include a body 82, a pair of front wheels, a pair of rear wheels, a pair of front door assemblies, a pair of slide door assemblies, a back door assembly, a frame assembly, and a powertrain. The frame assembly and the powertrain are omitted from FIGS. 1 and 2 for simplicity and clarity of the drawings.

Referring to FIG. 1, a left-side front wheel 84L is shown, a left-side rear wheel 86L is shown, a left-side front door assembly 88L is shown, a door 10 of a slide door assembly is shown, and a back door assembly 92 is shown. A mirror image of the left-side front wheel 84L, left-side rear wheel 86L, left-side front door assembly 88L, door 10 of a slide door assembly are included on the opposite of the vehicle and obstructed from view.

The vehicle 80 can include a pair of front seats and a pair of rear seats mounted in a passenger area of the vehicle 80, or may only include the pair of front seats. The vehicle 80 may also include a pair of third row seats mounted in the passenger area of the vehicle 80 behind the pair of rear seats. Each pair of seats may alternatively be configured as a bench providing two, three, four, or any number of individual seating positions. The body 82 can define a pair of front door openings 94L (the right-side front door opening is obstructed from view), and a pair of rear door openings 96L (the right-side rear door opening is obstructed from view) through which a passenger may pass in order to enter or exit the vehicle 80. The body 82 can also define a back door opening (the back door opening is obstructed from view) at a rear portion of the vehicle 80.

The door assemblies each can include a door and a window panel assembly, and can be configured to selectively open and close access through the respective door openings by moving between a closed position and a fully opened position. In the closed position, the door assemblies can span the respective door openings to obstruct access to an interior of the vehicle 80 via the door openings. In the closed position, each door assembly can be latched to the body 82 of the vehicle 80. The fully opened position can be any position where the door assemblies are moved away from the respective door openings to provide substantially unobstructed access to the interior of the vehicle 80 via the door openings.

In FIG. 1, the pair of front door assemblies and the back door assembly are hingedly attached to the body 82 of the vehicle 80, and pivot between opened and closed positions. Contrarily, the pair of sliding door assemblies of the present embodiment are slideably attached to the body 82 of the vehicle 80, and slide back and forth between opened and closed positions. However, each door assembly may also be configured to be hinged, slidable, or otherwise configured to be opened and closed so as to provide access through respective door openings.

Each door assembly of the vehicle 80 can be manually operated or motorized to move between opened and closed positions within respective door openings, which is discussed in more detail below.

Referring to FIG. 1, there is shown a schematic drawing of the circuit containing the power source 60, sensor 34, and vehicle door motor 62. The power source 60 of the vehicle can be in electrical communication with the sensor 34 and a vehicle door motor 62 configured to actuate the door between the open and closed position.

Figure 2:
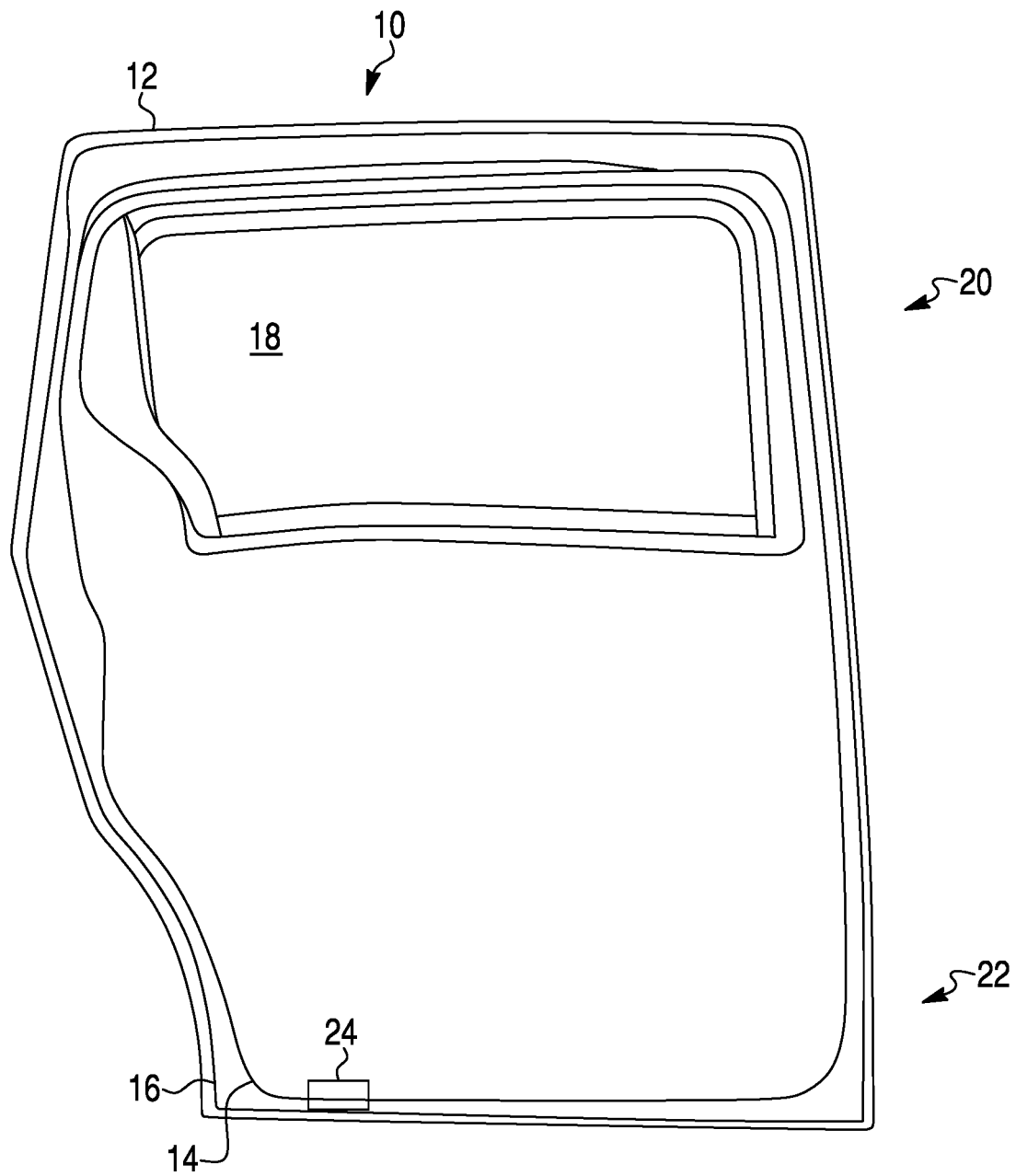
FIG. 2 is a side view of an interior of the vehicle door of FIG. 1.
Figure 3:
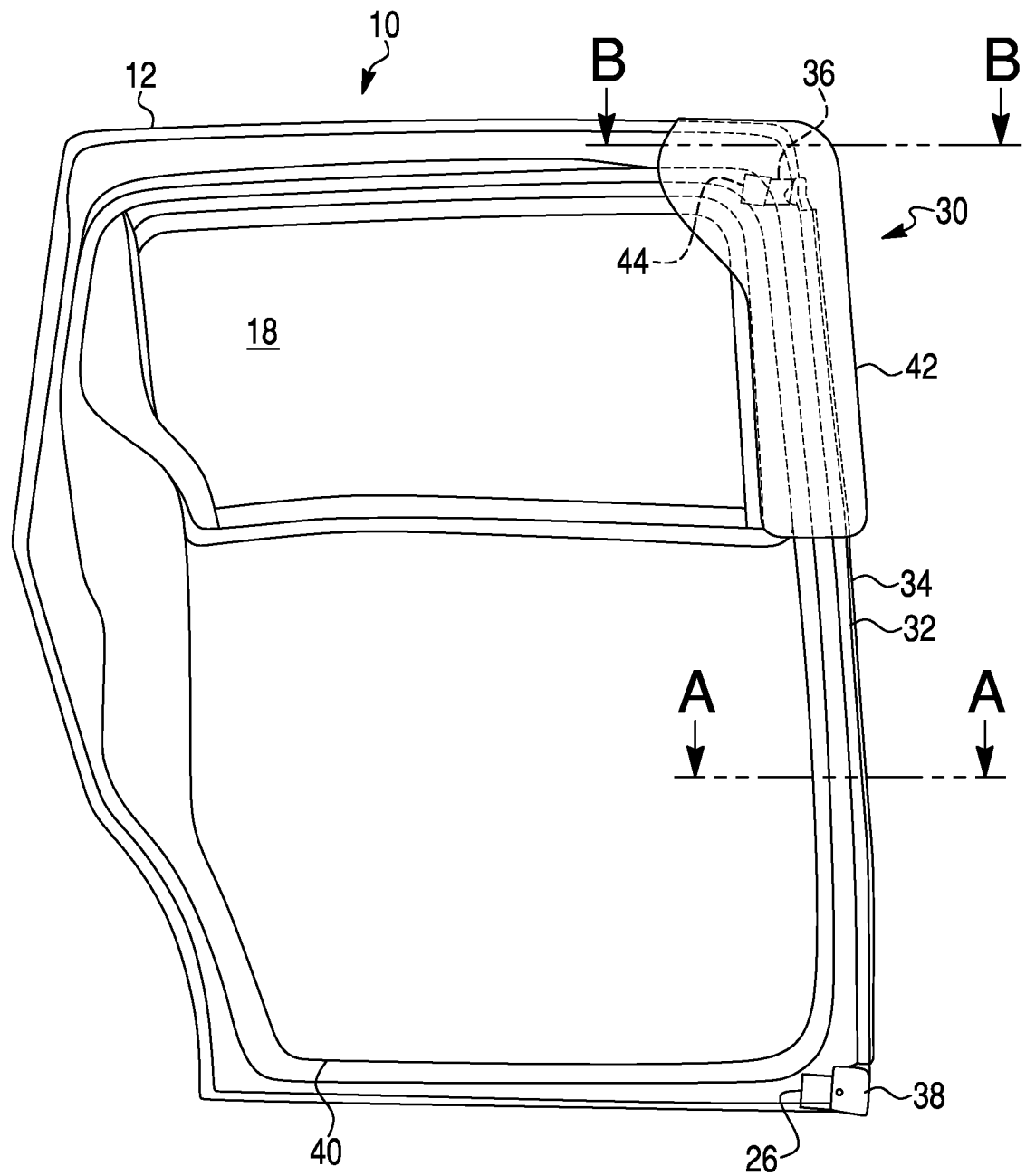
FIG. 3 is a side view of an interior of the vehicle door of FIGS. 1 and 2 including a trim panel and upper garnish attached.

Referring to FIGS. 2 and 3, there is shown an inner side view of the vehicle door 10. The vehicle door 10 can include a door frame 12, a trim panel 40 connected to the door frame 12, a bracket 32 disposed along an edge 66 of the trim panel 40 and extending along a length of the door frame 12 (also referred to as a length of the door), and a sensor 34 disposed on the bracket 32. The door frame 12 (can also be referred to as a door body) can include an inner door panel 14 and an outer door panel 16, a window opening 18, an upper portion 20, and a lower portion 22. In the exemplary embodiment, the vehicle door frame 12 can be a metal structure. The inner door panel 14 and the outer door panel 16 can together form the door frame 12. The window opening 18 can be configured to receive a window assembly of the vehicle 80. The window opening 18 can be located in the upper portion 20 of the door frame 12. The door 10 can also include an attachment 24 connected to the door frame 12 and configured to attach to a minivan sliding door attachment.

FIG. 3 shows an inner side view of the vehicle door 10 including the pinch sensor assembly 30 with the trim panel 40 and the upper garnish 42 attached to the door frame 12. The pinch sensor assembly 30 can include a bracket 32, an upper garnish 42, and a sensor 34. The bracket 32 can be located along a length of the door 10 and molded into the door trim panel 40. The upper garnish 42 can be located on the door 10 and include a connector such as a snap fit connector 44 (also referred to as a connection portion). The sensor 34 can be disposed on the bracket 32. The bracket 32 can include a second connector, such as a snap fit connector 36, configured to snap fit into the snap fit connector 44 of the upper garnish 42. In an exemplary embodiment, the upper garnish 42 can be located on the inner door panel 14 and extend from approximately midway of the door frame 12 to the top of the door frame 12 and disposed adjacent to the window opening 18. Alternatively, the upper garnish 42 can be disposed on both sides of the window opening 18 or can be disposed to wrap around the window opening 18 on the inner door panel 14.

The pinch sensor assembly 30 can be connected to the door frame 12 via the trim panel 40 and connected (e.g., snap fit) into the upper garnish 42. In the exemplary embodiment, the trim panel (also referred to as door trim) 40 can be plastic and can be configured to attach to the lower portion 22 of the door frame 12. The upper garnish 42 can be configured to attach to the upper portion 20 of the door frame 12. The snap fit connector 44 of the upper garnish 42 can be located within the upper garnish 42 or as a separate connector to join with the upper garnish 42. In other embodiments, the pinch sensor assembly 30 can be attached directly or indirectly to the door frame 12. The bracket 32 can include a second snap fit connector 36 configured to snap fit into the snap fit connector 44 of the upper garnish 42. The trim panel 40 and the upper garnish 42 can at least partially cover the pinch sensor assembly 30 when the trim panel 40 and the upper garnish 42 are attached to the door frame 12.

The pinch sensor assembly 30 can connect to the upper garnish 42 through a connection structure such as a snap fit mechanism. In an exemplary embodiment, the snap fit mechanism can be operated by snap fitting the snap fit connector 44 located on the upper garnish 42 to the second snap fit connector 36 located on the pinch sensor assembly 30. The pinch sensor assembly 30 can also be molded to the trim panel 40 and/or connected to the door frame 12 with an intermediate connector 48. The pinch sensor assembly 30 can include a wire harness connection component 38 (also referred to as a wire connector) in electrical communication with the sensor 34 and configured to connect to a mating wire harness connection component 26 located adjacent (e.g., within) the vehicle door 10. The bracket 32 can include a second snap fit connector 36 configured to snap fit into the snap fit connector 44 of the upper garnish 42.

The trim panel 40 and the upper garnish 42 can be separate and detachable from each other. Alternatively, the trim panel 40 and upper garnish 42 can be a unitary piece that attach to the door frame 12 together.

Figure 4:
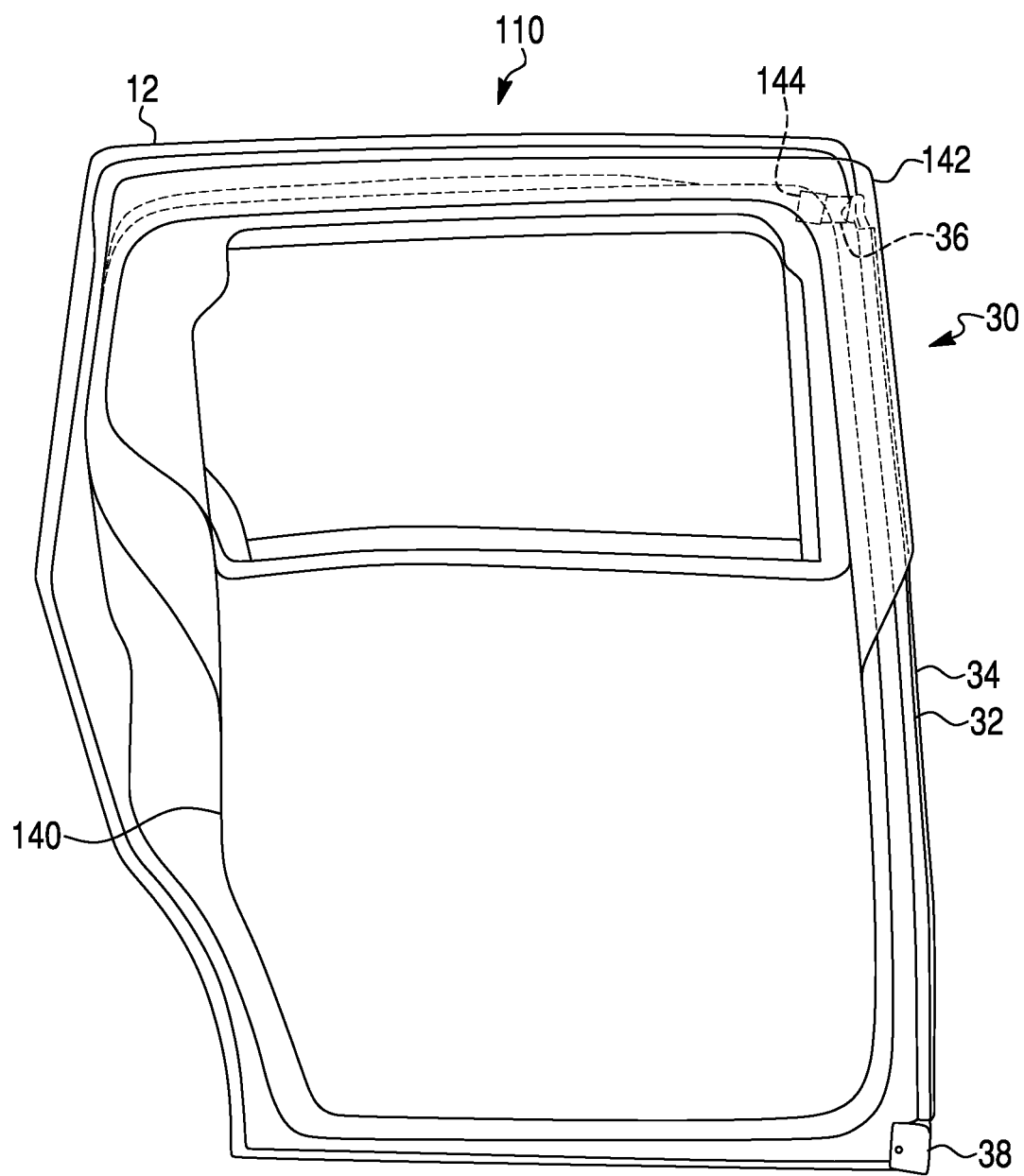
FIG. 4 is a side view of an interior of a vehicle door according to an alternate embodiment of the disclosed subject matter.

FIG. 4 illustrates a different embodiment of a vehicle door 110 that includes a trim panel 140 (also referred to as a unitary panel) that can include the trim panel and upper garnish formed as a continuous structure. In this embodiment the unitary panel 140 is configured to attach to the door frame 12. The unitary panel 140 can at least partially cover or be molded with or otherwise connected to a pinch sensor assembly 30. The unitary panel 140 can include a snap fit connector 144 located in the upper garnish 142 configured to snap fit to a second snap fit connector 36 of the bracket 32.

Figure 5:
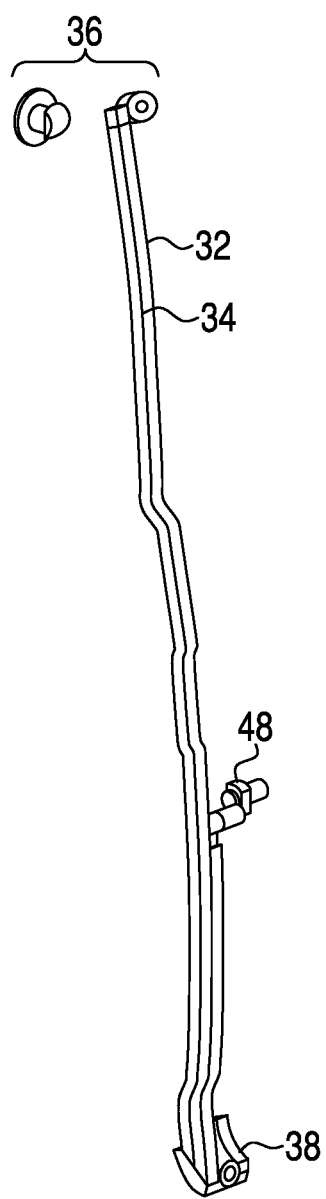
FIG. 5 is a perspective view of a bracket and pinch sensor made in accordance with principles of the disclosed subject matter.

FIG. 5 illustrates a pinch sensor (also referred to as sensor) 34 and a bracket 32. The bracket 32 can include a second snap fit connector 36 or the second snap fit connector 36 can be a separate connector configured to snap fit the bracket 32 into the upper garnish 42. The bracket 32 can include an intermediate connector 48 configured to attach the bracket 32 to the door 10 or door trim 40. The wire harness connection component 38 can be disposed at an opposing end of the bracket 32 from the second snap fit connector 36.

The inner pinch sensor 34 can be attached via the bracket 32 along an entire length of the door. Assembly of the bracket 32 to the door 12 can be achieved at an end of a manufacturing line for the door, at which time the bracket 32 can be snapped into the door trim/upper garnish. An electrical harness coupler can hang between the door trim and the door panel. During installation, a user can grab an electrical coupler such as wire harness connector 26 and connect it to an electric connector 38 of the inner pinch sensor 34 before installing the inner pinch sensor assembly into the garnish or door panel. The location of the connectors 26 and 38 can vary along the length of the sensor 34 and bracket 32 depending on the application and configuration of the door 10.

The bracket 32 can be molded into the door trim 40 and can be the length of a height of the door 10. The bracket 32 can extend from an upper portion 20 of the door frame 12 to a lower portion 22 of the door frame 12 when the bracket 32 is snap fit onto the door 10. The bracket 32 can include the sensor 34 embedded within so as to form an integral bracket and sensor together. Alternatively, the sensor 34 can be detachable from the bracket 32 or fixed to an outside surface of the bracket 32. The sensor 34 can also be referred to as a pinch sensor. The sensor 34 can be a capacitance sensor, a force sensor, a piezoelectric sensor, or any type of sensor for detecting when an object has come in to contact with the sensor 34 and/or bracket 32 or is otherwise in the path of the vehicle door 10 as it moves from an open position to a closed position (or from a partially open position to a sealed position). In an embodiment including a capacitance sensor, the sensor 34 can utilize the electrical property of capacitance and the change of capacitance based on a change in the electrical field around an active face of the sensor 34 to detect when an object has come in contact with the sensor 34. The sensor 34 can be configured to output a signal when a predetermined change in capacitance is detected and/or measured by the sensor 34. Alternatively, the sensor 34 can be configured to output a signal when a predetermined force is applied to the bracket 32. The sensor 34 can be configured to output a signal to engage a vehicle door motor 62 configured to actuate the vehicle door 10. The sensor 34 can be located along a length of the bracket 32. The sensor 34 can be on an outer surface of the bracket 32 so that the sensor 34 faces the B pillar 70. The sensor 34 can be disposed along the entire length of the bracket 32 such that the sensor 34 is also extended along the entire length of the vehicle door 10 in the vertical direction.

The second snap fit connector 36 can be a connector that attaches one end of the bracket 32 to the upper garnish 42 or door frame 12 itself. The second snap fit connector 36 can be a separate piece that enters through a hole or recess of the bracket 32 and then connect to the upper garnish 42 with locking protrusions of the second snap fit connector 36 mating with the snap fit connector 44 of the upper garnish 42. Alternatively, the second snap fit connector 36 can be an integrated piece of the bracket 32 having protrusions that are configured to lock into the snap fit connector 44 of the upper garnish 42. Other types of connectors can also be used to connect the bracket 32 to the upper garnish 42 or door frame 12.

An intermediate connector 48 can be located on the bracket 32 and configured to attach the bracket 32 to the door frame 12. The intermediate connector 48 can be a plastic clip having a protrusion that locks directly into the door frame 12 or garnish or door covering.

Figure 6:
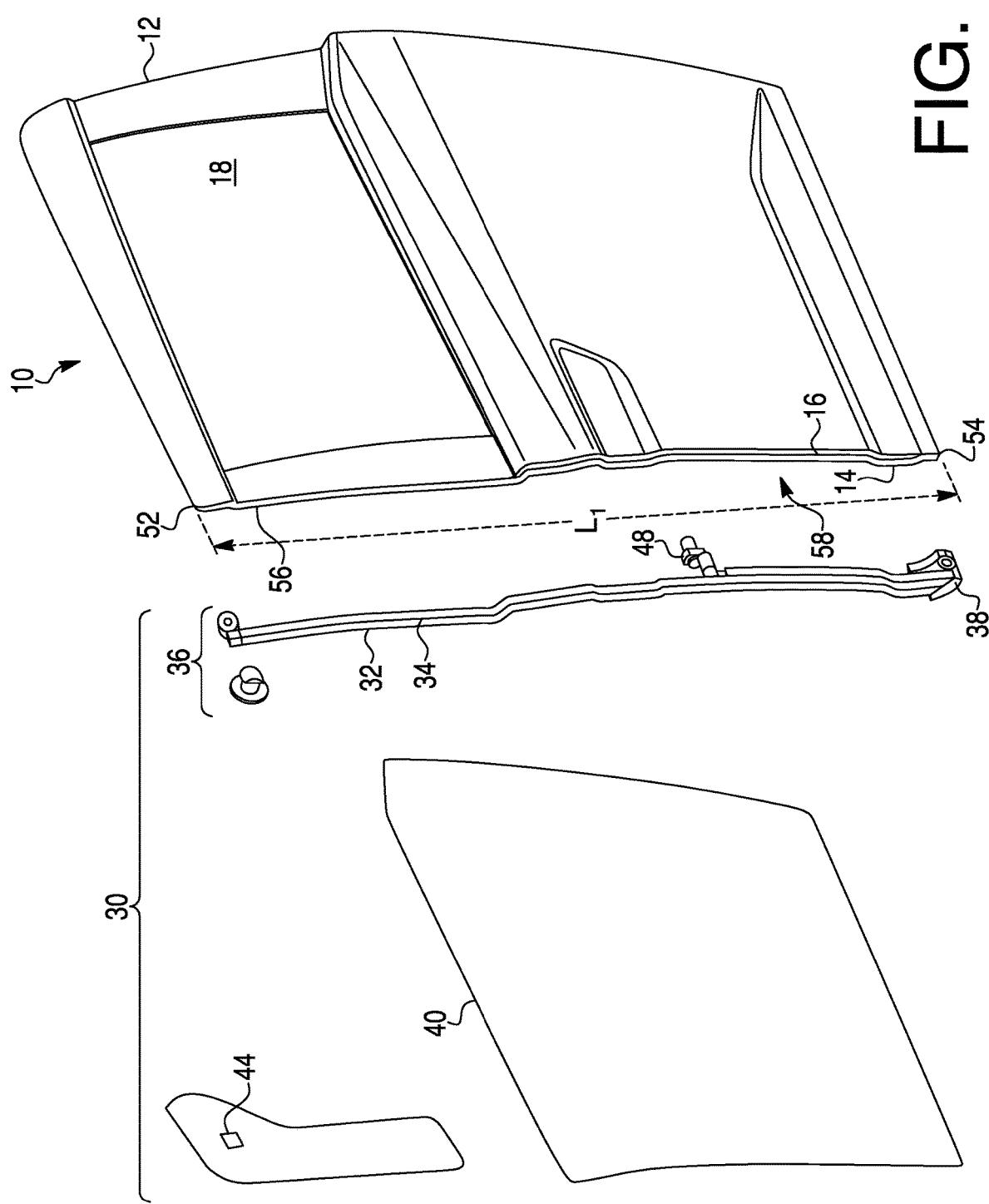
FIG. 6 is a perspective view of a pinch sensor assembly and a vehicle door in an unassembled state and made in accordance with principles of the disclosed subject matter.

FIG. 6 illustrates a side view of a pinch sensor assembly 30 and a door 10. The pinch sensor 34 can be formed into or attached along a bracket 32 located along a length of the door 10 and molded into or attached to the door trim 40, with an upper garnish 42 located on the door 10 and including a snap fit connector 44. The bracket 32 can include a second snap fit connector 36 configured to snap fit into the snap fit connector 44 of the upper garnish 42. Although FIG. 6 shows the bracket 32 disassembled from the garnish 42 and panel 40, we note that when assembled the bracket would be on the opposite edge of the panel 40 and garnish 42 as shown in FIG. 6. In particular, the bracket 32 and sensor 34 can be molded, pinched into, or otherwise attached to the outer most edge of the panel 40 and/or garnish 42 (at an edge located furthest from the door frame 12 in this figure). The bracket 32 and sensor 34 can also or alternatively be attached to the upper garnish 42 by connecting snap fit connector 36 of the bracket 32 to the snap fit connector 44 associated with the upper garnish 42.

In the embodiment shown in FIG. 6, the bracket 32 can extend along an entire length, L1, of the door 10 in a vertical direction V of the vehicle 80 when the bracket 32 is snap fit onto the door 10. The entire length, L1, can refer to the distance from a top leading corner 52 of the door 10 along a leading edge 56 of the door 10 to the bottom leading corner 54 of the door 10. The leading side 58 of the door can be the side of the door on which the leading edge 56, top leading corner 52, and bottom leading corner 54 are located. The leading side 58 of the door 10 can be the side that is adjacent to and closer to the B-pillar when the door 10 is attached to the vehicle 80.

Alternatively, the bracket 32 can extend in a vertical direction V of the vehicle 80 along a length different than the entire length of the door 10. For example, the bracket 32 can extend from the snap fit connector 44 of the upper garnish 42 to the wire harness connection component 38 disposed in a lower portion 22 of the door frame 12 in the vertical direction when the bracket 32 is snap fit onto the door 10. In another alternate embodiment, the second snap fit connector 36 can constitute one end of the bracket 32 and the wire harness connection component 38 can constitute another end of the bracket 32. In other embodiments, the bracket 32 can extend along a length of the door in the longitudinal direction L of the vehicle. Alternatively, the bracket 32 can extend along a length of the entire perimeter of the door 10. The bracket 32 can be disposed on an outer periphery of the door 10 when the bracket 32 is snap fit onto the door. The bracket 32 can be disposed at an outer edge 68 of the trim panel 40, an inner edge 64 of the trim panel 40, or a location between the outer edge 68 and the inner edge 64 of the trim panel 40.

The upper garnish 42 can be located on the door 10. The upper garnish 42 can be attached to the door 10 at an upper portion of the door frame 12. In the exemplary embodiment shown, the upper garnish 42 can be located on the leading side 58 of the door 10 on a side of the window opening 18. The upper garnish 42 can extend from a top of the door 10 on a roof side to a middle portion of the door near the bottom of the window opening 18 in the vertical direction V of the vehicle 80. In other embodiments, the upper garnish 42 can be located on both sides of the window opening 18 or can be located entirely surrounding the window opening 18 including above and below the window opening 18. The upper garnish 42 can include connectors to fasten directly to the door frame 12 and/or to the trim panel 40. The upper garnish 42 can be detachable from the door trim 40 and/or other portions of the door frame 12. In other embodiments, the upper garnish 42 and the trim panel 40 can constitute one unitary piece.

The upper garnish 42 can include a snap fit connector 44. The snap fit connector 44 can be configured to connect with the second snap fit connector 36 of the bracket 32. The snap fit connector 44 can be configured such that the bracket 32 can snap fit into the upper garnish 42. The bracket 32 can be secured against the door 10 through the snap fit connector 44 of the upper garnish 42. The upper garnish 42 can be plastic, wood, metal, carbon fiber, vinyl, faux-carbon fiber, faux-wood, any combination of these materials, or any other material known in the art for upper garnish elements in vehicles. Alternatively, connector 44 and/or connector 36 can connect to a mating connector on the door frame 12.

The pinch sensor assembly 30 can be attached to the door 10. In the embodiment shown in FIG. 6, the bracket 32 can be molded into the door trim 40 and snap fit into the upper garnish 42 with the second snap fit connector 36. In this embodiment, the pinch sensor assembly 30 can be connected to the door 10 through both the door trim 40 and the upper garnish 42. In other embodiments, the pinch sensor assembly 30 can have other connection points to the door. For example, in another embodiment the pinch sensor assembly 30 can snap fit to an upper garnish that is unitary with the door trim. Alternatively, the pinch sensor assembly 30 can snap fit directly on to the door frame 12.

Figure 7:
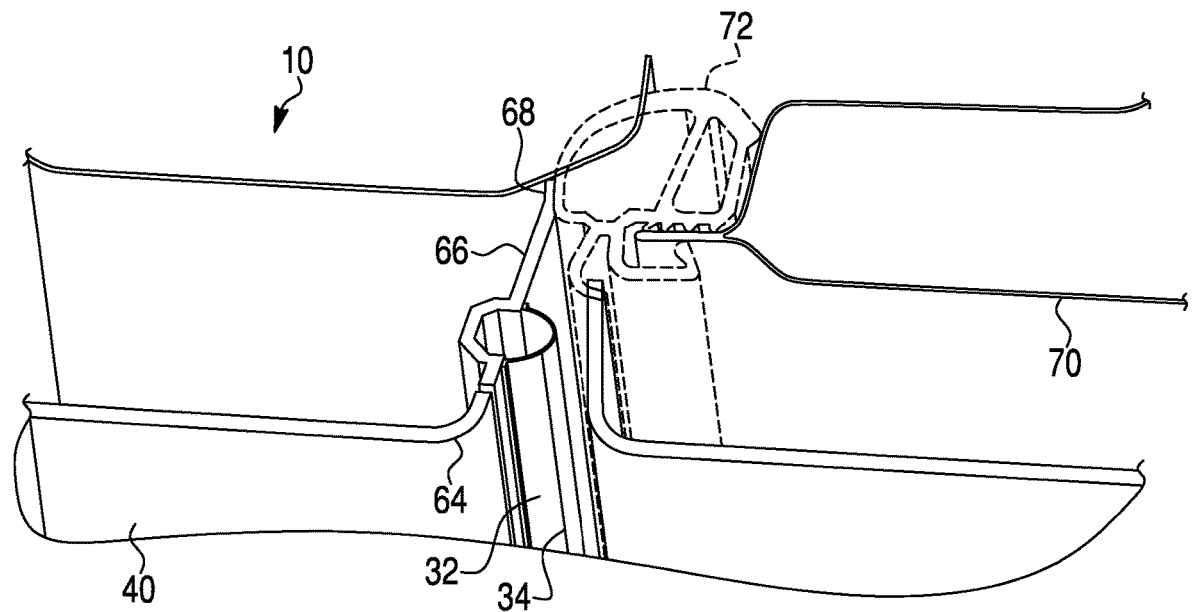
FIG. 7 is a section view taken along line A-A of the vehicle door of FIG. 3.

FIG. 7 illustrates a section view from the interior of the vehicle 80 of the pinch sensor assembly 30 attached to the door trim 40. The door trim 40 is connected to the frame 12 of door 10. The bracket 32 with the sensor 34 can be molded (or otherwise separately attached) to the door trim 40. Adjacent to the pinch sensor assembly 30 on the door 10 is the B pillar 70 of the frame assembly of the vehicle 80. The B pillar 70 can include a weatherstrip 72 disposed on an edge of the B pillar 70 such that the weatherstrip 72 contacts the door 10 when the door 10 is in a closed position. In FIG. 7, the weather strip is show in dotted line to show its "standing configuration" when the door is not sealed. In use the weather strip would actually be deformed in this figure by the door 10 to form a tight seal thereto at a location adjacent the outer edge 68 of trim panel.

Figure 8:
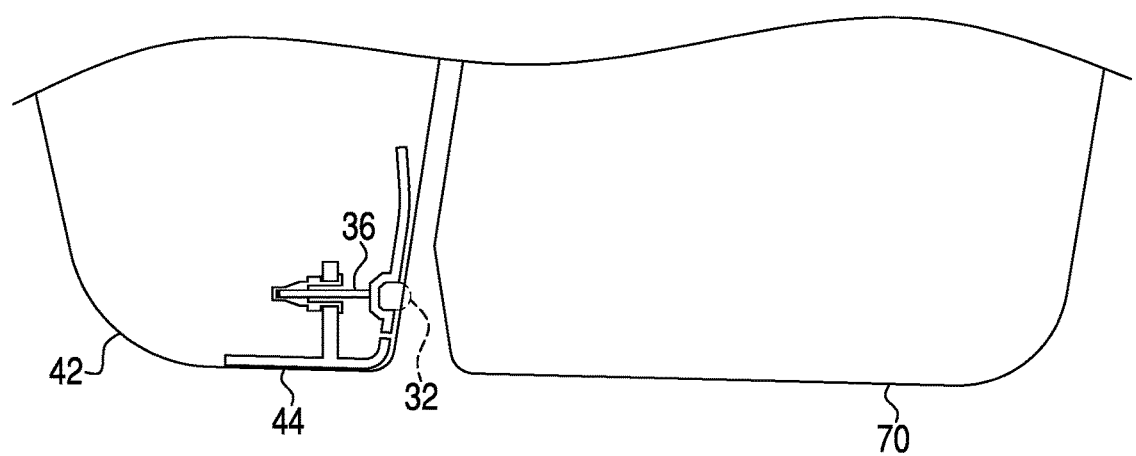
FIG. 8 is a section view taken along line B-B of the vehicle door of FIG. 3.

FIG. 8 illustrates a view from the interior of the vehicle 80 of the upper garnish 42. The bracket 32 is snap fit into the upper garnish 42 with the second snap fit connector 36 connected through snap fit to the snap fit connector 44 of the upper garnish 42. Adjacent to the upper garnish 42 and bracket 32 is the B pillar 70 with a garnish and the weatherstrip 72 connected so as to be disposed between the B pillar 70 and the door 10. In the embodiment shown in FIG. 8, the snap fit connector 44 includes a receiving portion that is configured to receive and hold a protrusion portion of the second snap fit connector 36. The protrusion portion of the second snap fit connector 36 can be pushed through the receiving portion of the snap fit connector 44 to snap fit and secure the bracket 32 to the upper garnish 42.

Next, a method for manufacturing the pinch sensor assembly 30 for a vehicle 80 will be described. In accordance with operation of some of the disclosed embodiments, an upper garnish 42 is attached to a vehicle door 10 so as to cover at least a portion of the interior of the vehicle door 10. A pinch sensor 34 is attached to or molded into a bracket 32 along an entire length of the bracket 32. The bracket 32 is molded into or attached to the door trim 40. The door trim 40 is attached to the vehicle door 10. Afterwards, the bracket 32 can be snap fitted into the door upper garnish 42. The bracket 32 can extend along a length of the vehicle door 10 such that the bracket 32 covers an entire length of the vehicle door 10 in a vertical direction of the vehicle 80. The snap fitting of the bracket 32 into the upper garnish 42 can occur when the vehicle door 10 is at the end of a door assembly line.

Figure 9:
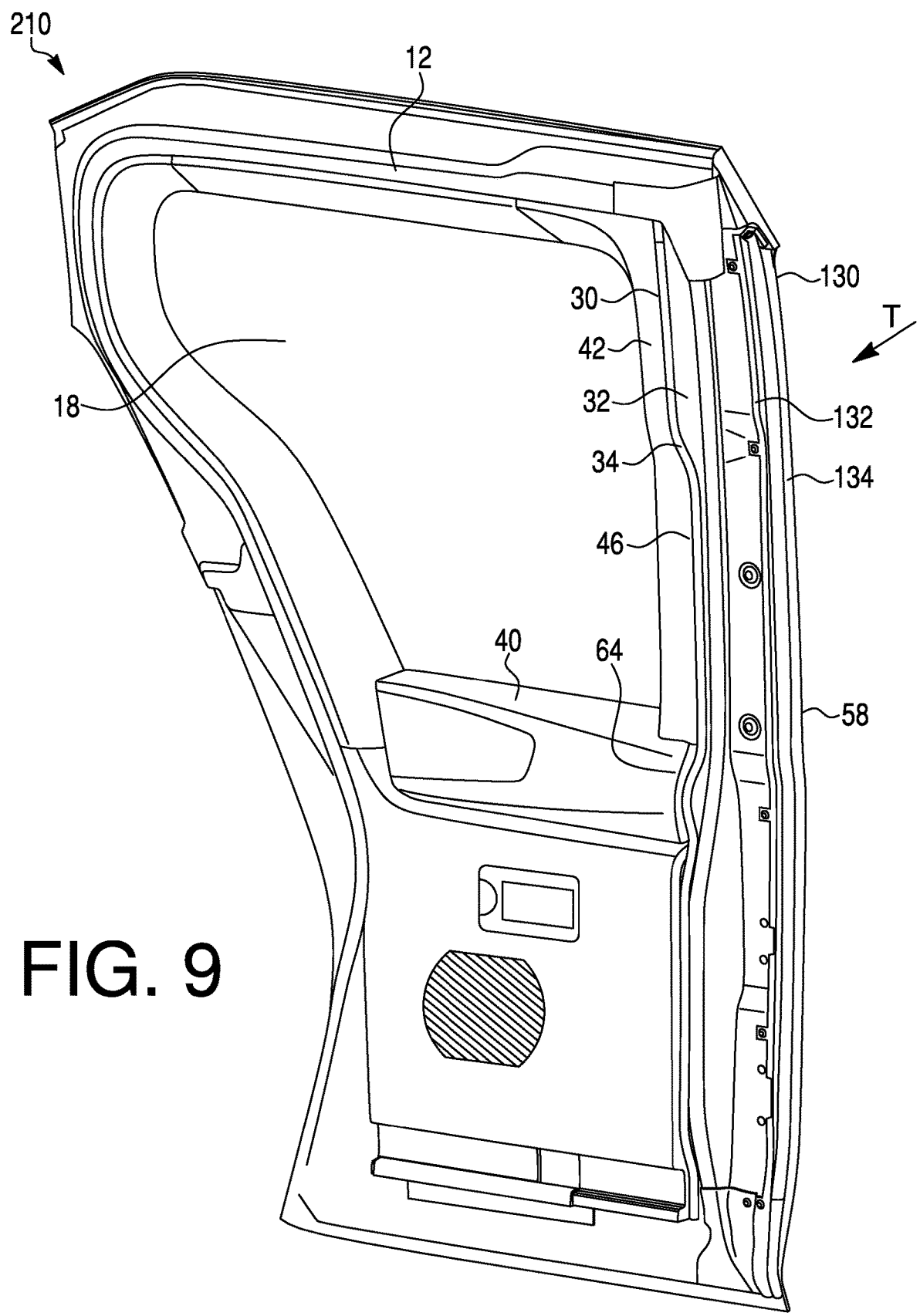
FIG. 9 is a perspective view of another embodiment of a vehicle door made in accordance with principles of the disclosed subject matter.
Figure 10:
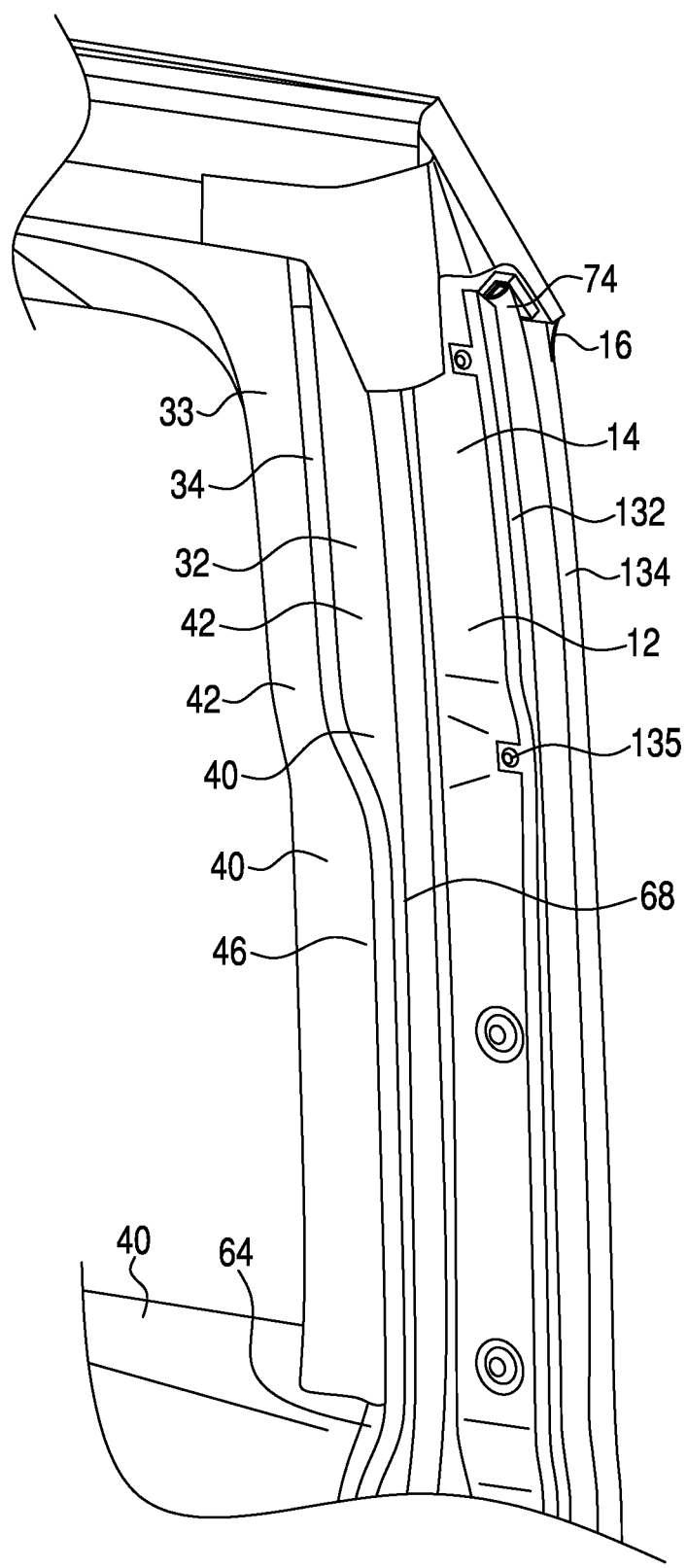
FIG. 10 is a detailed perspective view of an upper portion of the vehicle door of FIG. 9.
Figure 11:
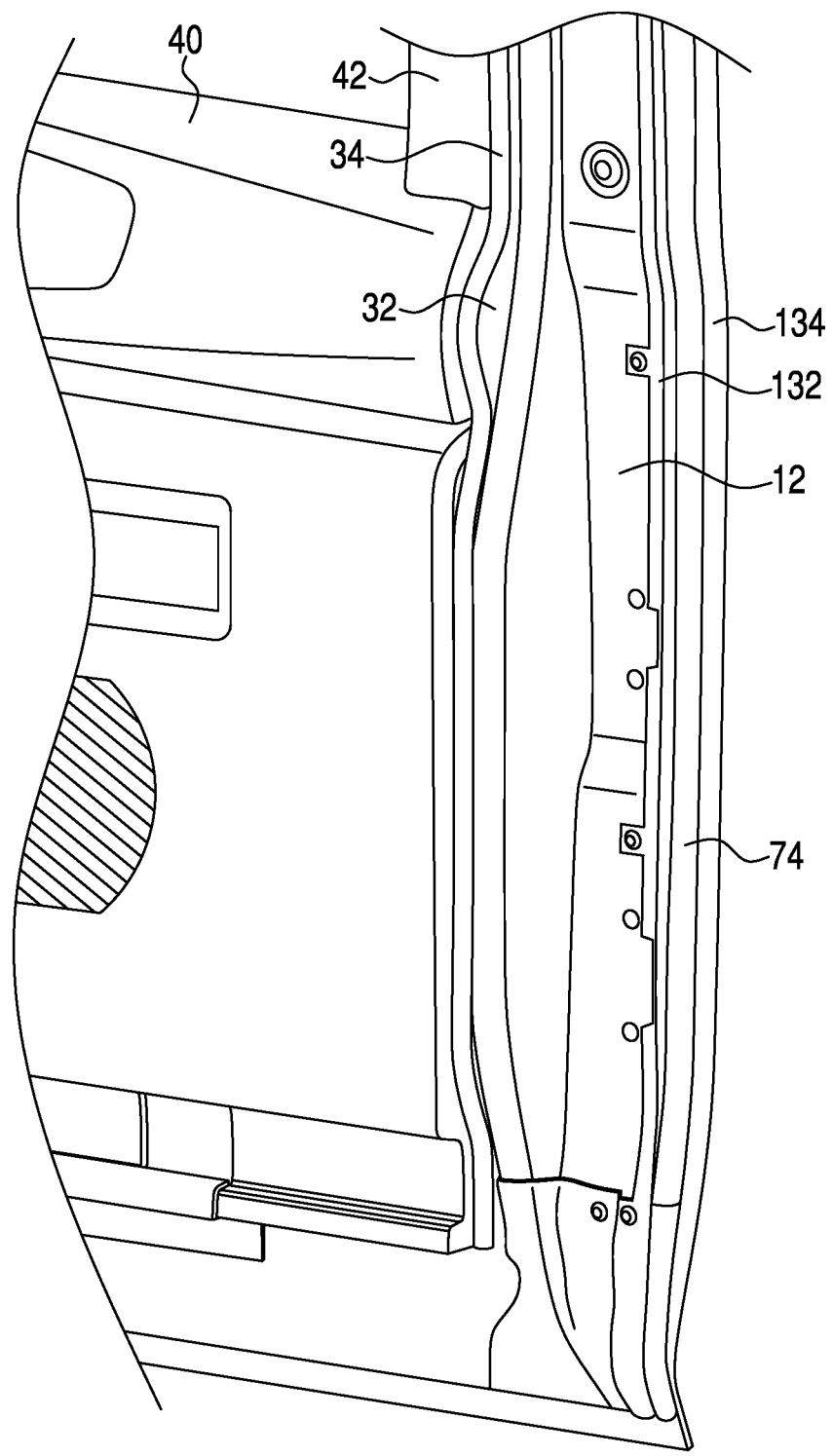
FIG. 11 is another detailed perspective view of a lower portion of the vehicle door of FIG. 9.

FIGS. 9-11 illustrate a different embodiment of a vehicle door 210 including an outer door pinch sensor assembly 130 attached to a leading outward edge of the door 210 and an inner door pinch sensor assembly 30 attached at an edge 64 of the door trim panel 40 that can define an inner pinch point where the door 210 meets an inner surface of the B-pillar (or trim adjacent the B-pillar) of vehicle 210. The pinch sensor assemblies 130 can each include a sensor 34, 134 and a bracket 32, 132. In this embodiment, the trim panel 40 can include an upper garnish 42 that is divided into two portions running along a side of a window opening 18 of the door 210. The two portions can include a lead window garnish 33 and bracket 32 that meet at an inner edge 46 of the trim panel 40. The bracket 32 and sensor 34 are spaced away from the bracket 132 and sensor 134 in a transverse direction T towards the interior of the vehicle 80. In addition, a portion of the door frame 12 can be visible between the sensor assembly 130 and sensor assembly 30 when the door 210 is in an opened state. An outer edge 68 of the garnish bracket 32 can define a first edge at which the door frame 12 is initially exposed between the sensor assembly 30 and sensor assembly 130 and bordered by a second edge defined by leftmost edge of bracket 132 in FIG. 10.

The bracket 132 can be attached via attachment structures 35 (e.g., bolts, screws, rivets, snap fit structures, welds, adhesives, etc.) to the door 210 and, as noted above, defines an opposed edge parallel to the edge defined by the outer edge 68 of the garnish bracket 32 such that a long strip of door frame 12 is exposed between the sensor assembly 130 and sensor assembly 30. The bracket 132 can also hold a door weatherstrip 74 that, with the bracket 132 and sensor 134, extend along an entire height (vertical dimension) of the door 210. The door weatherstrip 74, bracket 132, and sensor 134 each have a longitudinal axis that is parallel with respect each other's longitudinal axis, and extends in a vertical V direction, substantially perpendicular to the transverse T and longitudinal L directions of the vehicle 210. The bracket 132 can be attached to inner door panel 14 of the door frame 12 (or where the inner door panel 14 meets the outer door panel 16 at the leading edge of door 210) via separate attachment structure(s) or via friction fit.

Figure 12:
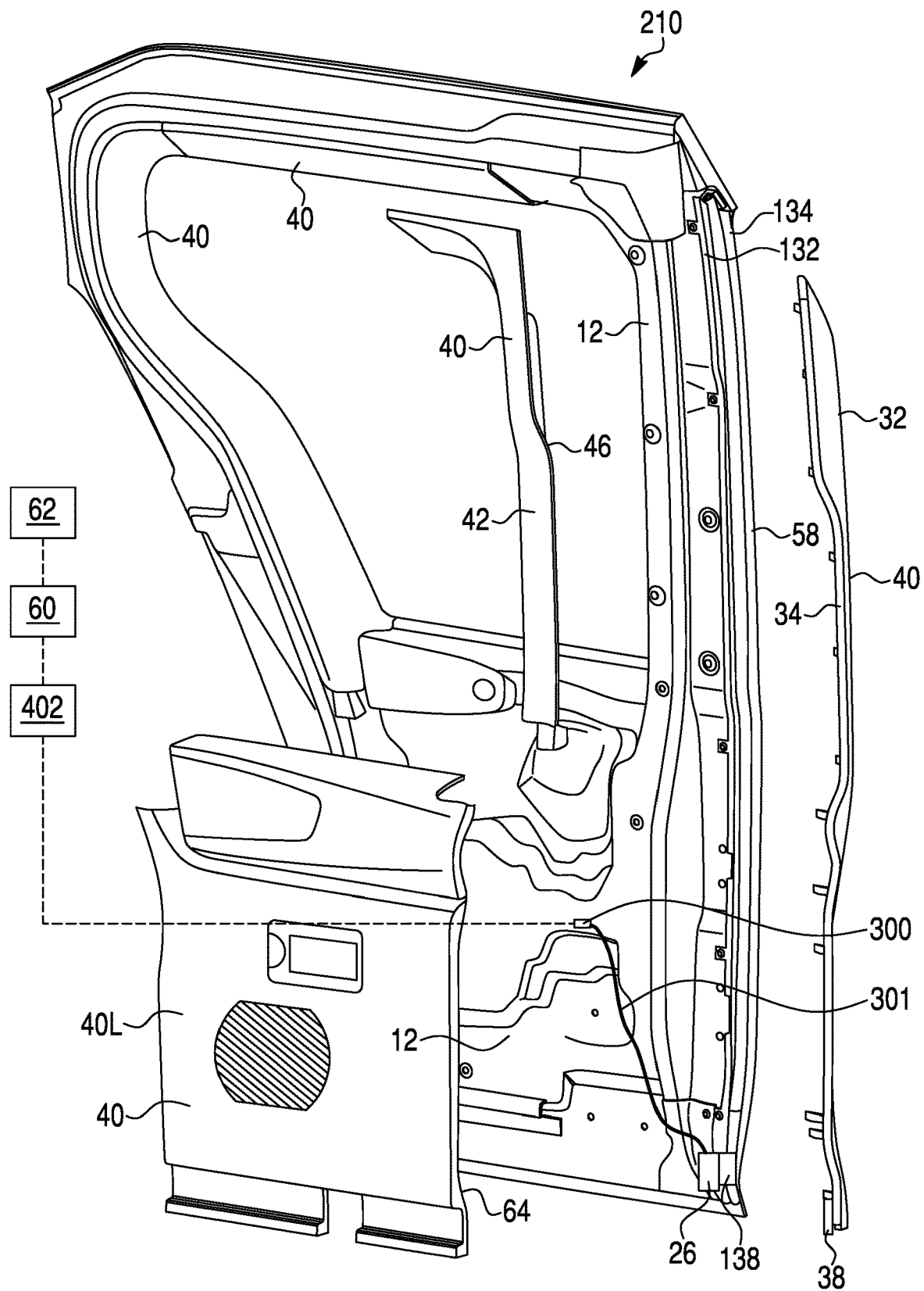
FIG. 12 is an exploded view of the vehicle door of FIG. 9.

In the exploded/unassembled view of FIG. 12, the pinch sensor 34 is shown as having a wire harness connection component 38, and pinch sensor 134 is shown with a second wire harness connection component 138. The connection components 38, 138 can be configured to electrically connect to a mating wire harness connection component 26 either together simultaneously (e.g., the connection component 38 connects to connection component 138 (or vice versa), and then after being connected, both components 38, 138 connect to wire harness connection component 26), or sequentially (e.g., the connection component 38 (or 138) electrically connects to wire harness connection component 26, and then the other connection component 138 (or 38) electrically connects to wire harness connection component 26) in any order. Once connected to the wire harness connection component 26, the sensor(s) 34, 134 are in electrical and/or signal communication with a power source 60, motor 62, and/or a controller 402 via wire(s) 301. The sensor(s) 34, 134 can be smart sensors (include a processor, controller and/or memory) to provide direct control to the motor 62 in order to cause the door to motor 62 to change operation upon the sensor(s) 34, 134 sensing an object in the doorway. Alternatively, the sensors 34, 134 can simply send a signal indicative of an object in the doorway to a separate controller 402 which in turn controls the motor 62 in accordance with a predefined protocol.

The wire(s) 301 can be connected at a location on the door frame 12 via connector 300 such that, during manufacture, and prior to connection of components 38, 138 and 26, the wire(s) 301 and connection component 26 hang from connector 300. Thus, the manufacturer can grasp the wire 301 and swing it away from the door frame 12 to connect components 38, 138 with connector 26, while also installing the final trim portions 40 (e.g., lower garnish 40L, upper garnish 42, and bracket garnish 32 to which the sensor 34 can be attached, or, bracket 132 to which the sensor 134 is attached). The number and shape of garnish 40 components can be determined based on the geometry of the door 201, placement of connector 300, and other factors. The sensor 34, 134 configured as part of the door trim component(s) allows the sensors 34, 134 to be attached to the vehicle 201 at an end of the production line for the door assembly during manufacture.

Each of the sensors 34, 134 can be a capacitance sensor, a force sensor, a piezoelectric sensor, or any type of sensor for detecting when an object has come in to contact with the sensor(s) 34, 134 and/or bracket 32, 132 or is otherwise in the path of the vehicle door 210 as it moves from an open position to a closed position (or from a partially open position to a sealed position). In an embodiment including a capacitance sensor, the sensors 34, 134 can utilize the electrical property of capacitance and the change of capacitance based on a change in the electrical field around an active face of the sensor 34, 134 to detect when an object has come in contact with the sensor 34, 134. The sensor 34, 134 can be configured to output a signal when a predetermined change in capacitance is detected and/or measured by the sensor 34, 134. Alternatively, the sensor 34, 134 can be configured to output a signal when a predetermined force is applied to the bracket 32, 132. The sensor 34, 134 can be configured to output a signal to directly (or indirectly via controller 402) to engage a vehicle door motor 62 configured to actuate the vehicle door 210.

The sensor 34 can be located solely on the bracket 32, and then assembled adjacent inner edges 46 and 64 of trim pieces 40. Alternatively, bracket 32 can be integral with and form an inner edge 64 of the trim panel 40 and an inner edge 46 of the upper garnish 42 with the sensor 34 located at the inner edges 46, 64. The bracket 32 and sensor 34 can be spaced away from the second bracket 132 and the second sensor 134 in a transverse direction T towards the interior of the vehicle 80. The sensor 34 and second sensor 134 can each be configured to connect to the mating wire harness connection component 26 separately or can be joined to a common wire harness connection component configured to connected to the mating wire harness connection component 26. The second bracket 132 can be disposed directly on the door frame 12 (and/or 14). The second bracket 132 can also be spaced apart from the bracket 32 in the longitudinal direction of the vehicle. Thus, the second bracket 132 can be located further toward a front of the vehicle on a leading side 58 of the door 210 than the bracket 32.

In FIG. 12, the wire(s) 301 is shown as a single line having a connection component 26 to be connected to connection component 38 and connection component 138

(simultaneously or in sequence). However, wire(s) 301 can include two separate and distinct lines, each with a separate connection component 26 for connection to a respective one of the connection component 38 and 138. Thus, connection components 26, 38, 138 would have greater ability to be placed at different locations and attached to the door frame 12 or electrically connected together at different times during the assembly of the door 201. Similarly, there could be additional connectors 300 for hanging separate ones of the wires 301 on the door frame 12 at different locations, depending on assembly timing and geometry desired for the various door parts. Each of the trim pieces 40, including the brackets 32, 132, upper garnish 42, lower garnish 40L, can include snap fit connectors for connecting to each other and/or the frame 12.

ALTERNATIVE EMBODIMENTS

While certain embodiments of the invention are described above, it should be understood that the invention can be embodied and configured in many different ways without departing from the spirit and scope of the invention.

As disclosed above, embodiments are intended to be used with any type of vehicle. The power source for the vehicle 80 can be an internal combustion engine, an electric motor or a hybrid of an internal combustion engine and an electric motor. The power source configured as an internal combustion engine or a hybrid power source can have the engine output axis oriented in the longitudinal direction L or in the traverse direction T of the vehicle. The engine can be mounted forward of the front axles, rearward of the rear axles, or intermediate the front and rear axles. A separate power source 60 can be provided to move the door to the sealed position as described above. Alternatively, power can be drawn from the main power source for the vehicle 80. In addition, two or more power sources 60 can be used for closing the door: a first power source for longitudinal motion, and a second power source for sealing motion in a transverse direction. A linkage can also be used instead of the second power source to cause the sealing motion for the door 10.

Electrical communication lines (not numbered) can connect a controller to the engine, power sources, the transmission and any sensors, including the pinch sensor, in any appropriate manner. Electrical communication can be either one-way communication or two-way communication and can be networked or not networked. The controller also can be referred to as an electronic control unit (ECU) or as a central processing unit. The sensors can be configured with hardware, with or without software, to perform the assigned task(s). The sensors can be configured as a smart sensor such that the sensors can process the raw data collected by the sensors prior to transmission to the ECU or the sensors can be configured as a simple sensor that passes the raw data directly to the ECU without any manipulation of the raw data. The sensors can be configured to send data to the ECU, with or without a prompt from the ECU, or to send data to any other controller (such as a door motor controller) for processing or acting thereupon.

In exemplary embodiments, the trim panel can be made from any material known in the art for interior vehicle panels. Examples of trim panel materials include, but are not limited to, plastic, wood, carbon fiber, metal, combinations of any of these materials, faux-carbon fiber, faux-wood, polymers, and reinforced padded materials.

In exemplary embodiments, the upper garnish can be made from any material known in the art for interior vehicle panels. Examples of trim panel materials include, but are not limited to, plastic, wood, carbon fiber, metal, combinations of any of these materials, faux-carbon fiber, faux-wood, polymers, and reinforced padded materials.

In exemplary embodiments, the bracket can be made from any material known to one of ordinary skill in the art for vehicle door pinch sensors. The bracket material can be, but is not limited to, plastic, rubber, composite, polymer, metal, or any combination of these materials.

In exemplary embodiments the bracket can be elastically deformable, rigid, or can retain its shape after force has been removed. Bracket height is not limited to the door height. The bracket can be longer, shorter, or extend around the entire outer periphery of the door.

The bracket can include portions that contain the sensor, or the sensor can extend the entire length of the bracket. The sensor can be disposed on an outer surface of the bracket, or the sensor can be located within the bracket.

In the disclosed embodiments, connection and/or attachment of any of the trim panel, upper garnish, unitary panel, bracket, bracket, and pinch sensor assembly can use any known form of connection to one of ordinary skill in the art. Examples include, but are not limited to, screws, fasteners, clips, molding, adhesives, bolts, pins, elastically deformable mating pieces, male and female connectors, locking protrusions, welding, and locking mechanisms.

As disclosed above, embodiments are intended to include the bracket snap fitting into the upper garnish. The snap fit connector and the second snap fit connector can be separate pieces from the bracket and the upper garnish or the snap fit connector can be an integral part of the upper garnish and the second snap fit connector can be an integral part of the bracket or any combination thereof. Snap fitting can refer to a connection mechanism wherein two pieces are joined together, or connected, by applying pressure as one piece enters another. As pressure is applied, the connection portions of the respective pieces will elastically deform until they are joined. Once joined successfully, the connection portions will return to their original shape and will be mated. However, one of ordinary skill in the art will recognize other snap fit mechanisms that are possible. The upper garnish and bracket may be snap fit using a push pin piece to join the bracket into the upper garnish. Any connection mechanism that utilizes pushing together two structures together until they are locked together can be used as a snap fit mechanism for the exemplary embodiments. Additionally, any other connection known in the art can be used to connect the upper garnish and the bracket.

In exemplary embodiments the wire harness connection component can be located anywhere along bracket.

In exemplary embodiments the signal output by the pinch sensor can go to the vehicle ECU. Alternatively, the signal can go directly to an actuator controlling the powered vehicle door.

The door can also be referred to as a powered door, sliding door, minivan door, second door, middle door, powered vehicle door.

The bracket can extend along the entire length of any of the following: the door, the door frame, the door body, the upper portion and/or lower portion of the door frame. The bracket can extend along any of these listed structures in the vertical direction of the vehicle, the longitudinal direction of the vehicle, the depth direction of the door and any combination of these directions. The depth direction of the door can be orthogonal to the vertical direction and the longitudinal direction when the door is attached to the vehicle and in a closed position. For example, the bracket can extend around the entire periphery of the door spanning both the vertical direction and the longitudinal direction.

In exemplary embodiments, the length of the door refers to portion of the door that extends in the vertical direction of the vehicle. Alternate embodiments contemplate lengths in other dimensions of the door such as, but not limited to, the width of the door (also referred to as the length of the door in a longitudinal direction of the vehicle), the depth or thickness direction of the door, and lengths spanning multiple directions such as around a perimeter or outer periphery of the door that spans both a vertical direction and a longitudinal direction that can otherwise be referred to as a circumferential length of the door. The length of the door can also refer to the length of the door frame and the length of both the door and the door frame can be measured as the same length.

In exemplary embodiments, the bracket can be disposed anywhere on the vehicle door known in the art for positioning a pinch sensor assembly. For example, in a depth direction of the door, the bracket can be located on a leading edge of an inner door panel of the door frame. In other embodiments, the bracket can be located on a leading edge of an outer panel of the door frame. Additionally, the bracket can be located at any point in the depth direction of the door and the vertical direction along the door frame of the door in between the inner door panel 14 and the outer door panel 16 such that the bracket 32 is configured to contact an object, as the door slidably moves between the open position and closed position, before the object obstructs an opening in the vehicle between the frame assembly and the door 10.

Because the sensor 34 and bracket 32 can be pre-assembled with the door panel or trim 40, the pinch sensor 34 can be installed at an end of the door assembly line (e.g., when door trim is attached to the door to finalize assembly of the door 10). Thus, it is not necessary to separately fit the sensor 34 directly onto a leading edge of the door frame 12. Instead, the sensor 34 can be attached to the door with the final trim attachment steps or process.

Exemplary embodiments are also intended to cover different types of connectors and/or attachment points for the pinch sensor assembly. For example, the bracket 32 can be molded or attached directly on to the door frame instead of the door trim. In exemplary embodiments, the bracket 32 can be attached at multiple points on the door and is not limited to the door trim 40 and upper garnish 42.

Exemplary embodiments are intended to cover all software or computer programs capable of enabling processors to implement the above pinch sensor assembly. Exemplary embodiments are further intended to cover such software, computer programs, systems and/or processes provided through any other currently known, related art, or later developed medium (such as transitory mediums, carrier waves, etc.), usable with the exemplary operations disclosed above.

What is claimed is:

1. A pinch sensor assembly for a vehicle having a door including door trim, the assembly comprising:
    a bracket located along a length of the door and molded into the door trim;
    an upper garnish located on the door and including a snap fit connector; and
    a sensor disposed on the bracket, the bracket including a second snap fit connector configured to snap fit into the snap fit connector of the upper garnish, wherein
    the bracket extends along an entire length of the door in a vertical direction of the vehicle when the bracket is snap fit onto the door.

2. The pinch sensor assembly according to claim 1, wherein the sensor is configured to output a signal when a predetermined force is applied to the bracket.

3. The pinch sensor assembly according to claim 1, wherein the sensor is a capacitance sensor.

4. The pinch sensor assembly according to claim 1, wherein the upper garnish is plastic.

5. The pinch sensor assembly according to claim 1, wherein the door trim is plastic.

6. The pinch sensor assembly according to claim 1, wherein the upper garnish is detachable from the door trim.

7. The pinch sensor assembly according to claim 1, wherein the upper garnish and the door trim are unitary.

8. The pinch sensor assembly according to claim 1, further comprising:
    a wire harness connection component in electrical communication with the sensor and extending from the bracket.

9. The pinch sensor assembly according to claim 8, wherein the wire harness connection component is configured to connect to a mating wire harness connection component located in the door.

10. The pinch sensor assembly according to claim 1, wherein
    the bracket extends from an upper portion of the door to a lower portion of the door when the bracket is snap fit onto the door, and
    the upper garnish is located in the upper portion of the door.

11. The pinch sensor assembly according to claim 1, wherein the bracket is disposed along an outer periphery of the door when the bracket is snap fit onto the door.

12. A vehicle door comprising:
    a door frame including an inner panel and an outer panel connected to the inner panel;
    a trim panel mounted onto the inner panel;
    an upper garnish mounted onto the inner panel, and at least one of the upper garnish and door frame including a connection portion;
    a bracket disposed along an edge of the trim panel and extending along a length of the door frame, and
    the bracket including a connector portion that is connectable to the connection portion of the at least one of the upper garnish and door frame; and
    a sensor disposed on the bracket.

13. The vehicle door according to claim 12, wherein the bracket is disposed at an outer edge of the trim panel.

14. The vehicle door according to claim 12, wherein the bracket is disposed at an inner edge of the trim panel.

15. The vehicle door according to claim 12, wherein the bracket is disposed between an outer edge and an inner edge of the trim panel.

16. The vehicle door according to claim 12, wherein the bracket extends along an entire length of the door frame in a vertical direction.

17. The vehicle door according to claim 12, wherein the sensor is a capacitance sensor configured to output a signal when a predetermined change in capacitance is measured by the sensor.

18. The vehicle door according to claim 12, further comprising:
    an attachment structure located at the door frame and configured to connect to a minivan sliding door attachment, wherein
    the sensor is configured to output a signal to engage a vehicle door motor configured to actuate the vehicle door.

19. A method for manufacturing a pinch sensor assembly for a vehicle, the method comprising:
attaching an upper garnish to a vehicle door so as to cover at least a portion of the interior of the vehicle door;
providing a door trim;
providing a bracket that includes a pinch sensor;
attaching the bracket to the door trim;
attaching the door trim to the vehicle door;
snap fitting the bracket into the upper garnish when the vehicle door is at an end of a door assembly line; and
extending the bracket along the vehicle door such that the bracket covers an entire length of the vehicle door in a vertical direction of the vehicle.

* * * * *